United States Patent [19]

Drew, Jr. et al.

[11] 4,024,053
[45] May 17, 1977

[54] APPARATUS AND METHOD FOR DETECTING AND DISPENSING ARTICLES OF PRESELECTED WEIGHTS SUSPENDED FROM SHACKLES

[75] Inventors: Bernard Drew, Jr., Gainesville; John H. C. Auyang, Lilburn, both of Ga.

[73] Assignee: Gainesville Machine Company, Inc., Gainesville, Ga.

[22] Filed: Sept. 26, 1975

[21] Appl. No.: 616,928

[52] U.S. Cl. .................................. 209/73; 209/121; 177/210 R; 177/DIG. 3
[51] Int. Cl.² .......................................... B07C 5/16
[58] Field of Search ............ 209/121, 73, 74, 74 M; 177/DIG. 3, 210

[56] References Cited
UNITED STATES PATENTS

| | | | |
|---|---|---|---|
| 3,108,648 | 10/1963 | Williams, Jr. | 177/DIG. 3 |
| 3,627,127 | 12/1971 | Whiteford | 209/121 |
| 3,651,936 | 3/1972 | Powell | 209/121 |
| 3,692,129 | 9/1972 | Pratt | 177/DIG. 3 |
| 3,709,309 | 1/1973 | Williams et al. | 177/DIG. 3 |

*Primary Examiner*—Allen N. Knowles
*Attorney, Agent, or Firm*—Newton, Hopkins & Ormsby

[57] ABSTRACT

Apparatus is disclosed for detecting and dispensing articles of preselected weights suspended from shackles movable along a path by conveyor means. The apparatus comprises scale means for successively weighing the shackles and articles at a weighing station along the path, mechanical to electrical transducer means coupled with the scale means for generating analog electrical signals indicative of the sensed weights, and means for digitizing the analog electrical signals. The apparatus further comprises digital computer means for comparing the digitized electrical signals with sets of digital word bits indicative of a preselected set of weight ranges, and for generating article release command signals indicative of weight ranges in which the sensed article weights are computed to lie. The apparatus further includes electrical to mechanical transducer means for releasing articles from the shackles at a plurality of dispensing stations along the path in response to release command signals received from the computer means.

A method is also disclosed for detecting and dispensing articles of preselected weights suspended from shackles which may be practiced through use of the disclosed apparatus.

6 Claims, 6 Drawing Figures

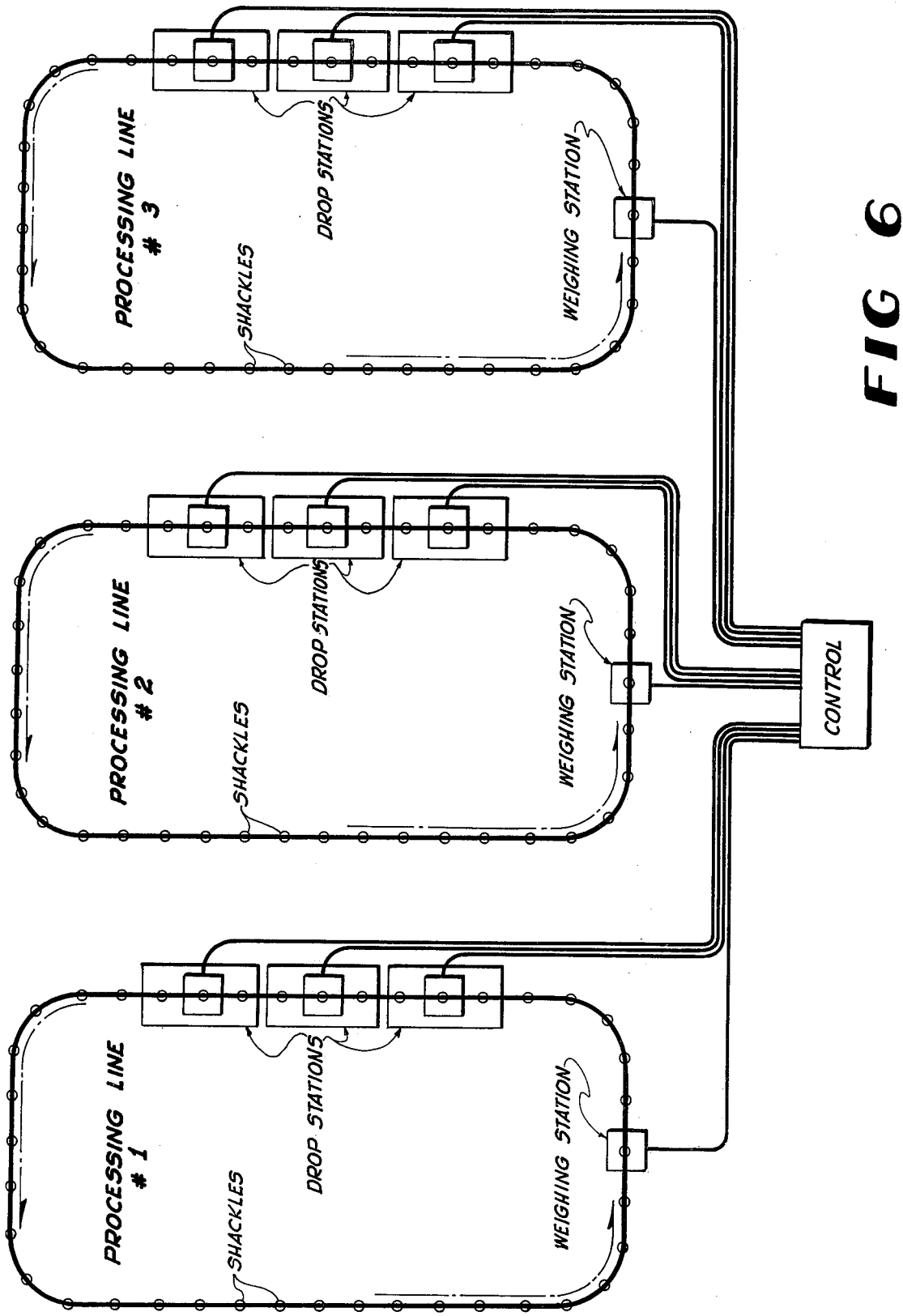

APPARATUS AND METHOD FOR DETECTING AND DISPENSING ARTICLES OF PRESELECTED WEIGHTS SUSPENDED FROM SHACKLES

REFERENCE TO RELATED APPLICATION

This application is related to U.S. patent application Ser. No. 416,517 now U.S. Pat. No. 3,918,587, filed Nov. 16, 1973.

BACKGROUND OF THE INVENTION

This invention relates generally to apparatuses and methods for detecting and dispensing articles of preselected weight suspended from shackles, and particularly to apparatuses and methods for detecting and dispensing poultry or other farm products being conveyed along a processing line suspended from shackles.

In poultry processing plants automatic apparatus is frequently incorporated into conveyor lines to identify and dispense fowl suspended from shackles which fall within a preselected weight range. Heretofore, such automatic apparatus has typically taken the form of pivotal weight scales over which the shackles are successively brought. Movements of such scales within a preestablished range of distances actuates selected members of a set of microswitches. Actuation of the proper set of microswitches generates a signal which is fed to an electrical to mechanical transducer causing a trip arm to pivot the hock engaging portion of the shackle being weighed thereby dispensing the bird.

The just described method has been noticeably lacking in certain respects. For example, the microswitches tend to wear out rapidly thereby creating need for frequent replacement. The scale pivot points also tend to wear excessively which wear adversely effects both the accuracy of the scale as well as creating need for frequent pivot replacement. The actual movement of the scales themselves creates bounce which generates vibrations that lead to inaccuracies in such a dynamic environment as that associated with conveyor lines.

More recently, as disclosed in the above mentioned related application, which is assigned to the assignee of the present application, an electromechanical system has been devised for detecting and dispensing shackle-borne fowl of preselected weights. This system employs a load cell coupled with a platform at a shackle weighing station for generating electric signals indicative of the weight of articles carried by the shackles as they are momentarily supported on the platform. Switching means are electrically coupled with the load cell responsive to the magnitude of signals received therefrom. A solenoid is also coupled with the switching means that operates a shackle trip lever to release a fowl weighing within a preselected weight range.

The just described electromechanical apparatus has provided a decided advance in the art of automated poultry weighing and dispensing due to its relatively high degree of functional accuracy and minimal maintenance requirements. Indeed, its own success has increased the functional demands placed thereon in the forms of greater usage and accuracy. Poultry processing plants today typically have a number of independent process lines that operate simultaneously. Each line contains a number of drop stations for independently collecting fowl of selected weights. The redundancy occasioned by multiple systems creates substantial costs. Weight detection accuracy has even surpassed certain process conditions such as variations in the tare weights of individual shackles. Equipment users are even desiring automated record keeping capabilities. In short, the just mentioned success has itself created new needs for enhanced weight detection and dispensing capabilities and accuracies.

Accordingly, it is a general object of the present invention to provide improved apparatuses and methods of detecting and dispensing articles of preselected weights suspended from shackles movable along conveyor lines.

More particularly, it is an object of the present invention to provide apparatuses and methods for detecting and dispensing articles of preselected weights suspended from shackles with a relatively high degree of functional accuracy.

Another object of the invention is to provide improved apparatuses and methods for detecting articles of preselected weights suspended from shackles movable along a plurality of conveyor lines and for dispensing them at a plurality of collection stations along each of the lines.

Yet another object of the invention is to provide apparatuses and methods of the type described capable of continuously distinguishing shackle tare weight variations in detecting articles of preselected weights.

SUMMARY OF THE INVENTION

In one form of the invention apparatus is provided for detecting and dispensing articles of preselected weights suspended from shackles movable along a path by conveyor means. The apparatus comprises scale means for successively weighing the shackles and articles at a weighing station along the path, mechanical to electrical transducer means coupled with the scale means for generating analog electrical signals indicative of the sensed weights, and means for digitizing the analog electrical signals. The apparatus further comprises digital computer means for comparing the digitized electrical signals with sets of digital word bits indicative of a preselected set of weight ranges and for generating article release command signals indicative of weight ranges in which the sensed article weights are computed to lie. The apparatus further includes electrical to mechanical transducer means for releasing articles from the shackles at a plurality of dispensing stations along the path in response to release command signals received from the computer means.

In another form of the invention a method is provided for sorting fowl according to weight suspended from shackles moving along a conveyor line. The method comprises the steps of generating analog electrical signals indicative of fowl loaded shackle weights, digitizing the electrical signals, comparing the digitized signals with digital word bits stored in a digital memory representative of a plurality of preselected fowl weight ranges, and transmitting release command signals to the shackle trip means in a plurality of shackle trip means predesignated to dispense fowl weighing within one of the preselected fowl weight ranges.

BRIEF DESCRIPTION OF THE DRAWING

FIG. 6 is a schematic diagram of a plurality of processing lines each having a plurality of dispensing or drop stations all controllable by the electronic control system shown in FIG. 5.

DETAILED DESCRIPTION OF THE DRAWING

Figure 1:
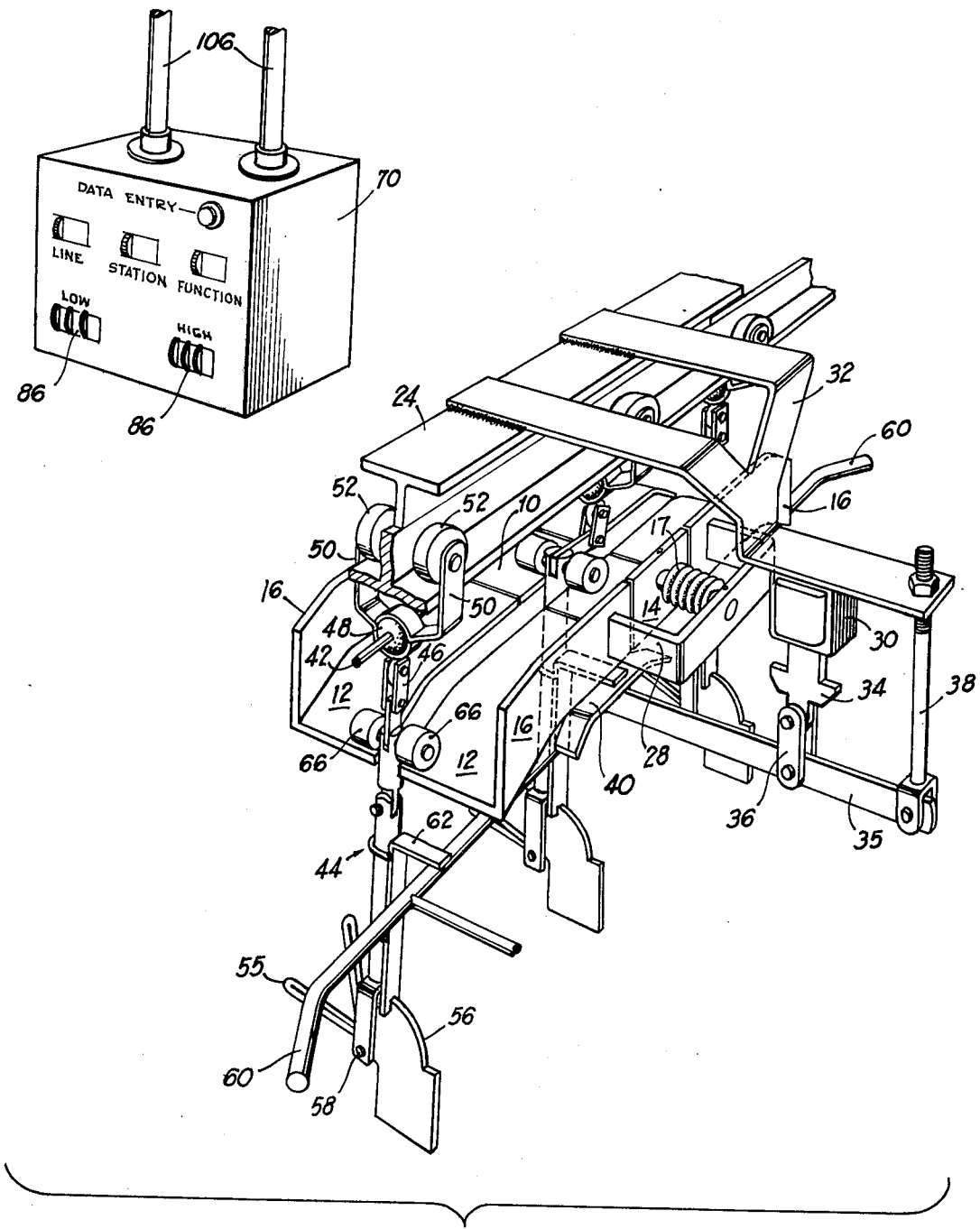
FIG. 1 is a perspective view of apparatus embodying principles of the present invention in one form.

Referring now in more detail to the drawing, there is shown in FIG. 1 apparatus at a combined scale and dispensing station where shackle borne fowl may be weighed and dropped. The apparatus comprises a centrally split platform 10 mounted substantially coplanar between the flat portions of two centrally split ramps 12. Two opposing side walls 14 project upwardly from the platform in longitudinal alignment with two pairs of ramp side walls 16. A mechanical to electrical transducer is provided in the form of two load beams 17 mounted between platform side walls 14 and yokes 28 that themselves are mounted to the ramp side walls 16. Each load beam serves to generate an electrical signal of voltage magnitude proportional to downward movement of the scale platform occasioned by the momentary presence of shackles thereon. The signals from the two load beams are summed to minimize inaccuracies occasioned by shackle bounce and wobble on the split platform.

With continued reference to FIG. 1 the fowl dispensing apparatus is seen to comprise an electrical to mechanical transducer in the form of a solenoid 30 mounted to an overhead I-beam 24 by means of a bifurcated solenoid support 32. Solenoid 30 includes a plunger 34 which projects downwardly beneath the solenoid and solenoid support. Plunger 34 is coupled to a lever arm 35 by means of a link 36. One end of lever arm 35 is pivotally coupled to solenoid support 32 by means of a threaded rod 38. A trip bar 40 is secured atop the other end of lever arm 35.

The just described apparatus provides a weighing and dispensing station disposed along a path defined by a conveyor line 42 from which a plurality of spaced shackles 44 are suspended by means of links 46. Each of the shackle suspension means includes a grommet 48 tightly secured about line 42 to which grommet a set of clamps 50 is attached. A pair of rollers 52 is rotatably mounted to clamps 50 which rollers movably support shackle 44 upon the track provided by I-beam 24. A pair of fork-shaped hock gripping elements 55 and a counterweight 56 are pivotally mounted to the bottom of shackle 44 by means of pivot pin 58 beneath shackle guide bar 60. An L-shaped shackle trip arm 62 is press-fitted within counterweight 56 with a laterally projecting portion disposed above trip lever 40. A second set of rollers 66 is rotatably mounted to an upper portion of shackle 44 to engage the inclined portion of ramp 12. Finally, a control box 70 is provided having multi-digit thumb wheel switches 86 for manually setting high and low weight limits, and other thumb wheel switches for designating other lines, stations and functions for data entry while a spring biased data entry button is depressed. A pair of conductor encasing conduits 106 extend from the control box to a computer hereinafter described.

Figure 2:
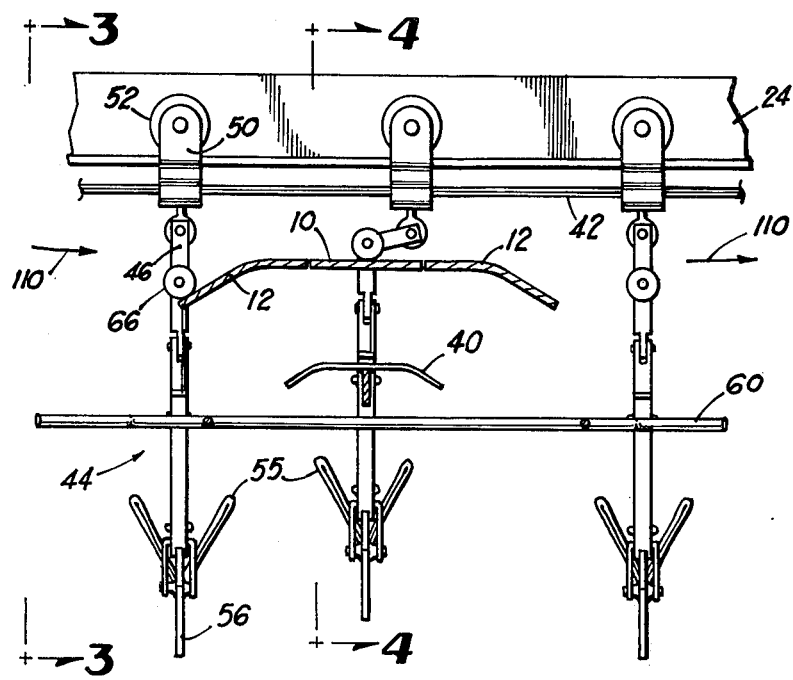
FIG. 2 is a side view in elevation of portions of the apparatus shown in FIG. 1.
Figure 3:
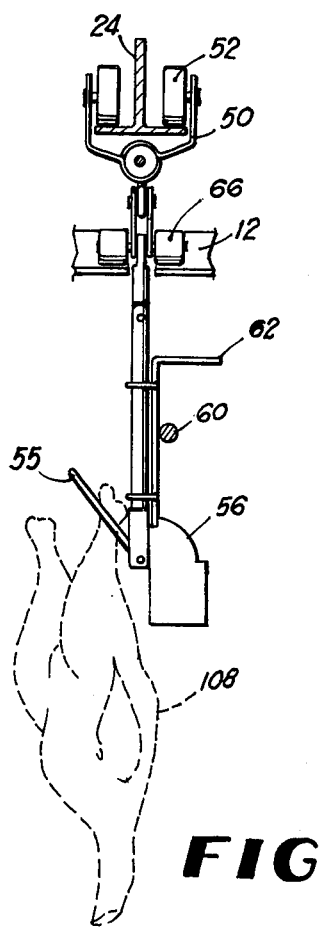
FIGS. 3 and 4 are end-on views taken along planes 3—3 and 4—4, respectively, illustrating an operative sequence of events in weighing and dispensing a chicken in a conveyor line system.
Figure 4:
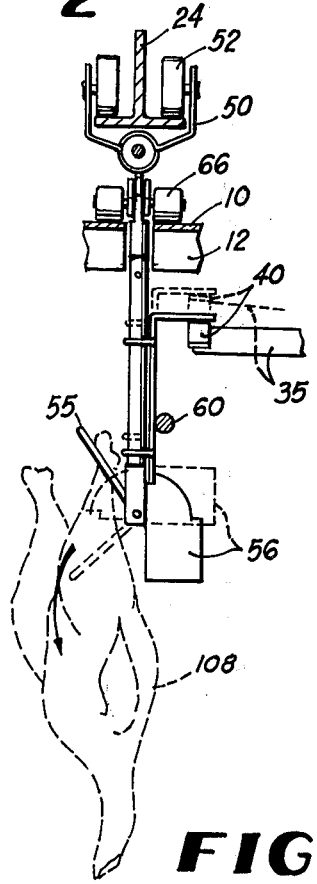

With reference now to FIGS. 2–4 an operative sequence of events may be visualized. As shackles 44 approach the weighing station in the direction indicated by arrows 110 supporting chickens 108, rollers 66 are seen to be brought into engagement with ramp 12. Continued movement of conveyor line 42 causes links 46 to pivot and thereby lift rollers 66 upwardly. This action causes most of the weight supported by rollers 66 upon the platform to be the tare weight provided by the shackle itself plus that of the bird suspended therefrom. Continued movement of the conveyor line causes the rollers 66 to move onto platform 10. The shackle will then proceed for a finite period of time across the top surface of the platform 10 and then move onto the level portion of the exit ramp 12. Continued movement of the conveyor line causes rollers 66 to descend down the exit ramp and pivot back to a vertical orientation between the shackle suspension means.

In the event the weight of a bird supported upon the shackle falls within the preselected weight range for the dispensing station just described, or for another down the line, solenoid 30 is energized by control means hereinafter described. Energization of the solenoid causes plunger 34 to rise thereby pivoting lever arm 35 and bringing trip bar 40 upwardly into engagement with shackle trip arm 62. The raising of trip arm 62 causes the hock tripping elements 55 to pivot downwardly to the position shown in dashed lines in FIG. 4 thereby permitting bird 108 to be released and fall into an unshown receptacle. Upon release of the bird from the hock gripping elements conterweight 56 causes the hock gripping elements 55 to return to their generally upright position shown in FIG. 3.

Figure 5:
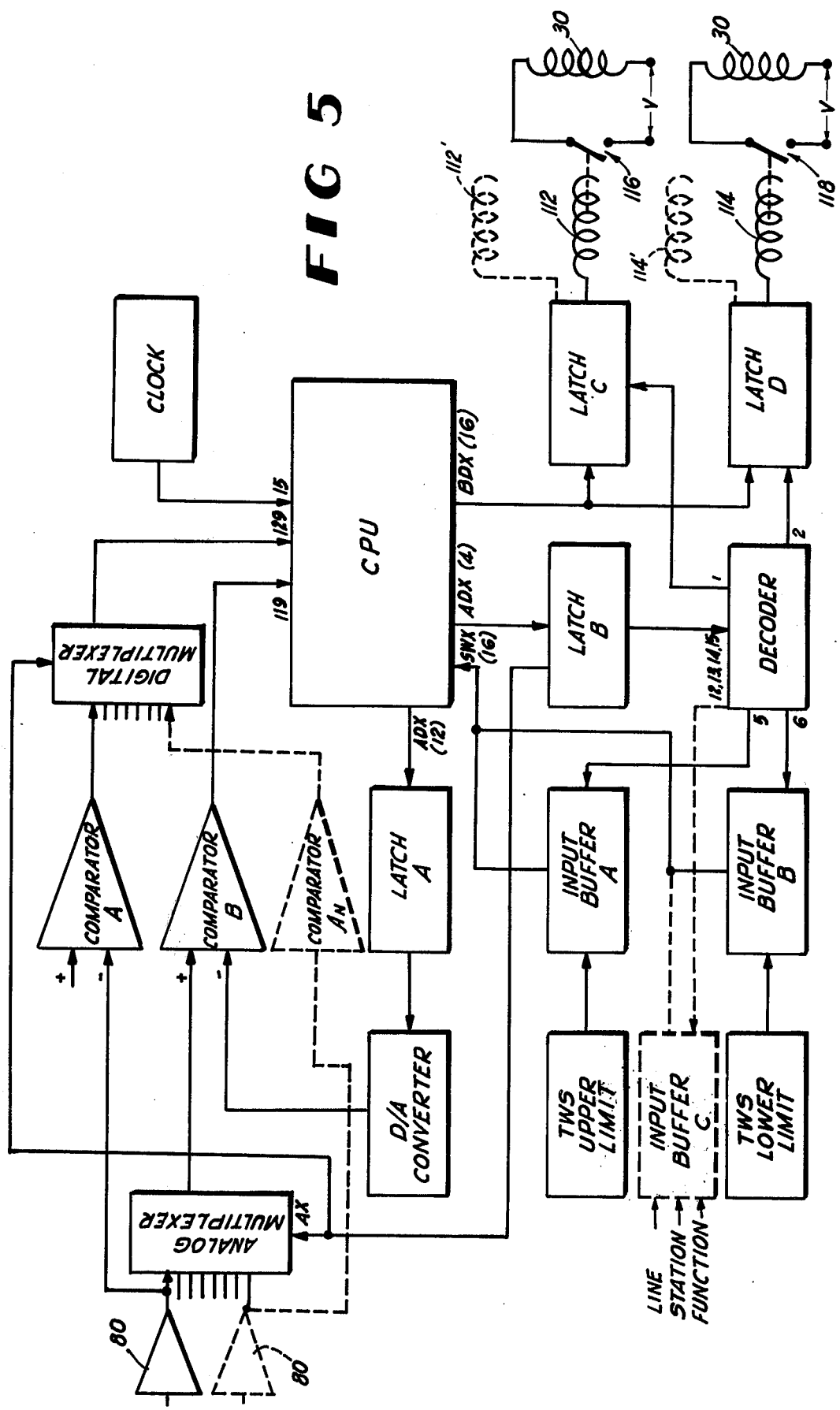
FIG. 5 is a block diagram of the electronic control system employed in the apparatus depicted in FIG. 1.

The apparatus electronic control system is shown in block diagram form in FIG. 5. For clarity of explanation the system illustrated in solid lines is adapted for controlling a single process line having but one weighing station and two dispensing stations. Normally, more weighing and dispensing stations located along one or more independent conveyor lines will be controlled by the system as shown in FIG. 6 and as exemplified in broken lines in FIG. 5. In the specificembodiment illustrated one set of control system components is identified as follows:

TABLE A

| | |
|---|---|
| CPU | National Semiconductor Integrated MicroProcessor Model No. IMP-16C |
| Digital Multiplexer | Type 74151 |
| Analog Multiplexer | Type AN7503N |
| D/A Converter | Datel Systems, Inc. Model No. DAC 6912B |
| Comparator A | Type 311 |
| Comparator B | Type 311 |
| Latch A | Type 7475 |
| Latch B | Type 7475 |
| Latch C | Type 74173 |
| Latch D | Type 74173 |
| Decoder | Type DM 8223 |
| TWS Upper Limit | Digitran Co. Series 23000 (4 digits) |
| TWS Lower Limit | Digitran Co. Series 23000 (4 digits) |
| Amplifiers 80 | Precision Monolithics Co. Model J7329 Operational Amplifier |
| Input Buffer A | Type 74125 |
| Input Buffer B | Type 74125 |

The reference letters and numbers in the figure designate pin numbers while the bracketed numbers designate pin quantities.

In operation, the CPU is programmed to step the analog multiplexer through latch B which sequentially senses the various input signals from amplifier 80. Simultaneously with this operation the CPU steps the digital multiplexer, also through latch B, to sequentially select input channels from amplifiers 80 through comparator A. In this manner both of the multiplexers simultaneously observe common lines eminating from a transducer coupled with a single weight scale. The function of comparator A is solely that of sensing a threshhold voltage indicating that a loaded shackle is momentarily positioned on the scale. This serves to avoid having the CPU operate unnecessarily, that is when no shackle or only an unloaded shackle is on the scale. When comparator A does sense threshhold it signals, through the digital multiplexer, the CPU to convert. The CPU thereupon generates a preprogrammed digital signal that is transmitted through latch A to the D/A converter. The converter converts the signal into analog form and transmits it to comparator B. This comparator then compares the signals from the analog multiplexer and the D/A converter and signals the CPU whether or not its two input signals match. When matched the CPU considers the number as the gross weight of the article and shackle weighed and stores it in memory.

With the operations just described the CPU is rendered capable of digitally determining the weights of fowl laden shackles. By having previously entered shackle tare weight data into memory, it may also digitally subtract the specific tare weight component of any sensed shackle borne fowl in computing the weight of the bird alone. Preferably this entry is made daily at the start of process operations by running all the shackles in an unloaded condition over the scales and entering their tare weights in successive order into memory. Once the CPU stores an article weight it searches the stored tare weights for the shackle weight for that which bears the same index as the present count and subtracts that tare weight from the gross weight for net article or fowl weight.

With continued reference to FIG. 5, the control system is further seen to be provided with both upper and lower limit thumb wheel switches, or TWSs, through which selected range data may be manually introduced into the CPU through input buffers A and B when signalled by an input buffer C through the decoder. The decoder also serves to select a latch C or D for time delayed energization of a solenoid 112 or 114 for energizing a shackle trip solenoid 30 through an associated switch 116 or 118. The particular latch energized is the one designated by the thumb wheel switches to dispense fowl detected as being within the upper and lower weight limits. Where the same weight range is selected for dispensing stations on two or more process lines, other solenoids 112' and 114' may be coupled with the same latches.

We thus see that apparatuses and methods are disclosed by which articles such as fowl suspended from shackles moving alone one or more process lines may be accurately weighed and sorted. The system is capable of accurately weighing articles that remain on the scales at weighing stations for only 250 milliseconds. A relatively simple microprocessor may be used since a relatively simple operation is being performed over and over. This reduces the need for substantial computing power that could be provided by more sophisticated machines. Maximum use of software is made since most all major functions are performed by such with the exceptions of input buffering, multiplexing and output gating.

It should, of course, be understood that the just described embodiment merely illustrates principles of the invention in one form. Many modifications may, of course, be made to the just described embodiment without departure from the spirit and scope of the invention as set forth in the following claims.

What is claimed is:

1. Apparatus for detecting and dispensing articles of preselected weights suspended from shackles movable along at least one path by conveyor means, comprising:
   a. scale means for successively weighing the shackles and articles suspended therefrom at at least one weighing station along the path;
   b. mechanical to electrical transducer means coupled with said scale means for generating analog electrical signals indicative of sensed weights of shackles and articles suspended therefrom supported on said scale means;
   c. means for digitizing the analog electrical signals;
   d. digital computer means for comparing the digitized electrical signals generated by said mechanical to electrical transducer means with sets of digital word bits indicative of a preselected set of weight ranges and for generating article release command signals indicative of weight ranges in which the sensed article weights are computed to lie;
   e. electrical to mechanical transducer means for releasing articles from the shackles at a plurality of dispensing stations along the path in response to release command signals received from said computer means; and
   f. said digital computer means includes means for storing another set of digital word bits indicative of sensed tare weights of a sequence of unloaded shackles in sequential order and for digitally subtracting said another set of digital word bits sequentially from said stored sets of digital word bits.

2. Apparatus for detecting and dispensing articles of preselected weights suspended from shackles movable along at least one path by conveyor means, comprising:
   a. scale means for successively weighing the shackles and articles suspended therefrom at least one weighing station along the path;
   b. mechanical to electrical transducer means coupled with said scale means for generating analog electrical signals indicative of sensed weights of shackles and articles suspended therefrom supported on said scale means;
   c. means for digitizing the analog electrical signals;
   d. digital computer means for comparing the digitized electrical signals generated by said mechanical to electrical transducer means with sets of digital word bits indicative of a preselected set of weight ranges and for generating article release command signals indicative of weight ranges in which the sensed article weights are computed to lie; and
   e. electrical to mechanical transducer means for releasing articles from the shackles at a plurality of dispensing stations along the path in response to release command signals received from said computer means, and said scale means includes a plurality of scales for weighing shackles and articles suspended therefrom at a plurality of weighing stations, wherein said mechanical to electrical transducer means includes a plurality of mechanical to electrical transducers coupled with said plurality of scales, and wherein said digital computer means includes analog multiplexing means coupled with said plurality of mechanical to electrical transducers for multiplexing analog signals received from said plurality of mechanical to electrical transducers.

3. Apparatus in accordance with claim 2 wherein said digital computer means includes first comparator means coupled with each of said mechanical to electrical transducers for comparing sensed weights with a preselected threshhold weight, and second comparator means coupled with said analog multiplexer for comparing sensed weights with said stored sets of digital word bits indicative of said preselected set of weight ranges.

4. In apparatus for detecting and dispensing articles of preselected weights suspended from shackles movable along at least one path having scale means for successively weighing the shackles and articles suspended therefrom at at least one weighing station along the path, mechanical to electrical transducer means coupled with the scale means for generating electrical signals indicative of the weight of shackles and articles suspended therefrom supported on the scale means, a plurality of electrical to mechanical transducer means for releasing articles from the shackles at a plurality of dispensing stations along the path, and electrical control means including a digital computer coupled with said plurality of mechanical to electrical transducer means and with said plurality of electrical to mechanical transducers for digitally comparing sensed article loaded shackle weight with a plurality of preselected weight ranges and for generating article release command signals indicative of weigh ranges in which sensed article weights are computed to lie, said digital computer has memory means for storing a plurality of preselected article weight ranges, and said digital computer has second memory means for storing a sequence of digital word bits representative of the tare weight of a succession of unloaded shackles.

5. The improvement in apparatus for detecting and dispensing articles according to claim 4 wherein said digital computer has means for subtracting said sequence of digital word bits representative of shackle tare weights stored in said second memory means digitally from weight data received from said mechanical to electrical transducer means.

6. A method of sorting fowl according to weight suspended from shackles moving along a conveyor line comprising the steps of:
a. generating analog electrical signals indicative of fowl loaded shackle weights;
b. digitizing the electrical signals;
c. comparing the digitized signals with digital word bits stored in a digital memory representative of a plurality of preselected fowl weight ranges; and
d. transmitting release command signals to the shackle trip means in a plurality of shackle trip means designated to dispense fowl weighing within one of the preselected fowl weight ranges, and wherein prior to step (a) tare weight data of a succession of shackles is sequentially generated and stored in a second digital memory, and wherein step (c) the digitized signals are compared with both the digital word bits stored in the digital memory and the tare weights sequentially stored in the second digital memory.

* * * * *